(12) United States Patent
Wilharm

(10) Patent No.: US 8,907,606 B2
(45) Date of Patent: Dec. 9, 2014

(54) METHOD AND DEVICE FOR DETERMINING A ROTOR POSITION OF A SYNCHRONOUS MACHINE

(75) Inventor: Torsten Wilharm, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 13/394,213

(22) PCT Filed: Jul. 15, 2010

(86) PCT No.: PCT/EP2010/060192
§ 371 (c)(1),
(2), (4) Date: May 21, 2012

(87) PCT Pub. No.: WO2011/026681
PCT Pub. Date: Mar. 10, 2011

(65) Prior Publication Data
US 2012/0223665 A1    Sep. 6, 2012

(30) Foreign Application Priority Data

Sep. 3, 2009 (DE) .......................... 10 2009 029 155

(51) Int. Cl.
*H02P 1/04*    (2006.01)
(Continued)

(52) U.S. Cl.
CPC .............. *H02P 6/185* (2013.01); *G01D 5/2013* (2013.01); *H02P 25/023* (2013.01)
USPC ................... 318/400.33; 318/400.12; 318/721

(58) Field of Classification Search
CPC ......... H02P 6/185; H02P 6/22; H02P 21/146; H02P 21/0053; H02K 29/12
USPC ................................ 318/400.33, 400.12, 721
See application file for complete search history.

(56) References Cited

U.S. PATENT DOCUMENTS

| 4,031,419 A | * | 6/1977 | Spiesberger et al. ...... 310/49.53 |
| 5,847,521 A | | 12/1998 | Morikawa et al. |
| 5,854,548 A | * | 12/1998 | Taga et al. ..................... 318/721 |

(Continued)

FOREIGN PATENT DOCUMENTS

| CN | 1358273 | 7/2002 |
| CN | 1496603 | 5/2004 |

(Continued)

OTHER PUBLICATIONS

International Search Report for Application No. PCT/EP2010/060192 dated Apr. 5, 2012 (English Translation, 2 pages).

*Primary Examiner* — Eduardo Colon Santana
*Assistant Examiner* — Gabriel Agared
(74) *Attorney, Agent, or Firm* — Michael Best & Friedrich LLP

(57) ABSTRACT

A method for determining a rotor position of a two-phase synchronous machine including two strands. The method is useful for electronically commuting the synchronous machine. The method includes alternately actuating each of the strands in a first actuating time window with an actuating value of positive polarity and in a second actuating time window with an actuating value of negative polarity, where the first and the second actuating time window alternately follow each other. The method further includes applying an actuating value of 0 during a measuring time window which is provided within at least one of the actuating time windows of a strand. The method further includes applying a measuring pulse to the corresponding strand within the measuring time window in order to measure the inductance of the corresponding strand as an indication of the rotor position. In general, the strand inductance is dependent on the rotor position.

8 Claims, 4 Drawing Sheets

(51) Int. Cl.
*H02P 6/16* (2006.01)
*H02P 23/00* (2006.01)
*H02P 6/18* (2006.01)
*G01D 5/20* (2006.01)
*H02P 25/02* (2006.01)

(56) References Cited

U.S. PATENT DOCUMENTS 7,388,367 B2 * 6/2008 Stauder et al. ........... 324/207.25
2007/0252587 A1 * 11/2007 Stauder et al. ........... 324/207.15

FOREIGN PATENT DOCUMENTS

| | | |
|---|---|---|
| CN | 1667942 | 9/2005 |
| DE | 102005015783 | 10/2006 |
| EP | 0793337 | 9/1997 |
| JP | 4359691 | 12/1992 |
| JP | 0937584 | 2/1997 |
| JP | 9238495 | 9/1997 |
| JP | 11235083 | 8/1999 |
| JP | 2007511190 | 4/2007 |
| JP | 2008245353 | 10/2008 |

* cited by examiner

METHOD AND DEVICE FOR DETERMINING A ROTOR POSITION OF A SYNCHRONOUS MACHINE

BACKGROUND OF THE INVENTION

The invention relates to synchronous machines, in particular permanent magnet synchronous machines, with a rotor producing a permanent magnetic flux. The invention also relates to the field of sensorless rotor position determination for synchronous machines.

For the electronic commutation of polyphase synchronous machines it is necessary to know the rotor position of the rotor of the synchronous machine in order to apply a suitable, rotor-position-dependent phase voltage to the respective winding phase of the synchronous machine. Conventionally, the phase voltage or the phase current is applied as a constant voltage or constant current as long as the rotor is located within a specific rotor position range, in particular when a rotor is within an angular position range of an electrical rotor position.

It is often the case with brushless DC motors or permanent magnet synchronous machines that the rotor position is determined using complicated sensor technology. For this purpose, use is often made of Hall sensors or GMR (Giant Magnetic Resistance) sensors, which are arranged close to a rotor of the synchronous machine and provide an electrical signal as a measure of the rotor position. Such sensors additionally arranged in the synchronous machine are generally susceptible to faults and represent additional complexity in the manufacture of synchronous machines.

There is therefore an increasing trend in favor of the use of sensorless methods for rotor position determination. In sensorless methods, evaluation of the current profile through the synchronous machine is conventionally performed. This is generally imprecise since interference signals are generally superimposed on the current profile in the synchronous machine. This is primarily the case during operation at low speeds and during on-load startup. Therefore, sensorless methods for rotor position determination can generally only be used to a limited extent.

It is also possible to determine the rotor position of the synchronous machine by measuring the inductance of the stator coil. The inductance of the stator coil varies depending on the rotor position owing to the saturation in the stator coils brought about by the rotor magnets. The dependence of the inductance of the stator coil is a consequence of the superimposition of the magnetic field brought about by the permanent magnets and the magnetic field brought about by the measurement pulse, which magnetic fields can be added to one another or cancel one another out, depending on the rotor position. In the case of additive superimposition of the magnetic fields, the stator coil enters saturation and the inductance thereof thereby decreases. This inductance is measured by a measurement pulse on the stator coil, with this measurement pulse preferably being applied when the stator coil in question is in the deenergized state in order to avoid firstly influences of the measurement pulse on the formation of torque and secondly reaction on the measurement of the instantaneous inductance.

The accuracy of the measurement of the rotor-position-dependent inductance requires that the stator coil is deenergized since otherwise an erroneous measurement of the inductance would result from the superimposition of the magnetic field produced by the drive current through the stator coil owing to the effect of the magnetic saturation. The rotor position therefore cannot be determined precisely.

SUMMARY OF THE INVENTION

The object of the present invention is to provide a method and a device with which it is possible to determine the rotor position of an electrical machine as more accurately than in prior methods and devices.

In accordance with a first aspect, a method for determining a rotor position of a two-phase synchronous machine having two winding phases, in particular for electronically commutating the synchronous machine, is provided. The method comprises the following steps:

driving each of the winding phases alternately in a first drive time window with a drive variable of positive polarity and in a second drive time window with a drive variable of negative polarity, the first drive time window and the second drive time window following one another alternately;

applying a drive variable of 0 to a first of the winding phases during a measurement time window, which is provided within at least one of the drive time windows of a winding phase;

applying a measurement pulse to the corresponding winding phase within the measurement time window in order to determine a rotor-position-dependent winding phase inductance of the corresponding winding phase as an indication of the rotor position.

One concept of the above-described method consists in that, in a two-phase synchronous machine with driving with successive drive time windows, with a shift with respect to one another, in particular through 90°, time windows are provided in which no drive variable, i.e. no voltage and no current, is applied to a winding phase, i.e. a phase arrangement comprising one or more coils which are connected together and are assigned to one phase. This is achieved by virtue of implementing driving, within the drive time window, with a drive variable unequal to 0 in a range of the electrical rotor position of less than 180°. This results in measurement time windows, within the drive time window, during which the corresponding winding phase is not driven, i.e. a voltage of 0 V is applied or said winding phase is not energized. This measurement time window is then suitable for performing a rotor position measurement by virtue of a measurement pulse being applied during the measurement time window without the associated disadvantages, as described above, with the two-phase synchronous machine.

Furthermore, an electrical rotor position is assigned to the determined winding phase inductance of the corresponding winding phase.

In accordance with one embodiment, measurement pulses can be applied regularly to the corresponding winding phase, with electrical commutation of the driving in the form of a change in the drive variable on the corresponding winding phase being implemented when the determined winding phase inductance of one of the winding phases exceeds or falls below a threshold value.

In particular, the measurement pulse can be applied, as a measured variable of positive or negative polarity, to one of the winding phases during a defined measurement pulse time window.

The rotor-position-dependent winding phase inductance can be determined by measuring an indication of an edge gradient of an edge of a resultant variable which is caused by the application of the measurement pulse, in particular by a predetermined winding phase inductance function.

In accordance with one embodiment, the indication of the edge gradient is implemented by two threshold value comparisons of the variable resulting from the application of the measurement pulse with predetermined threshold values, and the time period from the time at which a first of the threshold values is reached to the time at which a second of the threshold values is reached is provided as an indication of the edge gradient.

Furthermore, during the measurement time window, a drive current can be applied to a second of the winding phases, said drive current being selected in such a way that a torque of the synchronous machine generated during the measurement time window corresponds to a torque which is generated by application of drive variables unequal to 0 to both winding phases.

In accordance with a further aspect, a control device for operating a two-phase synchronous machine having two winding phases and for determining a rotor position of the synchronous machine, in particular for electronically commutating the synchronous machine, is provided. The control device is designed

- to drive each of the winding phases alternately in a first drive time window with a drive variable of positive polarity and in a second drive time window with a drive variable of negative polarity, the first drive time window and the second drive time window following one another alternately;
- to apply a drive variable of 0 to a first of the winding phases during a measurement time window, which is provided within at least one of the drive time windows of one of the winding phases,
- to apply a measurement pulse to the corresponding winding phase within the measurement time window in order to determine an indication of the rotor-position-dependent winding phase inductance of the corresponding winding phase as an indication of the rotor position.

In accordance with a further aspect, a motor system is provided. The motor system comprises:

- a two-phase synchronous machine having two winding phases;
- a bipolar driver circuit for providing a bipolar drive variable for each of the winding phases of the synchronous machine; and
- the above control device.

In accordance with a further aspect, a computer program product is provided which has a program code which, when run on a data processing device, implements the above method.

BRIEF DESCRIPTION OF THE DRAWINGS

Preferred embodiments will be explained in more detail below with reference to the attached drawings, in which.

DETAILED DESCRIPTION

Figure 1:
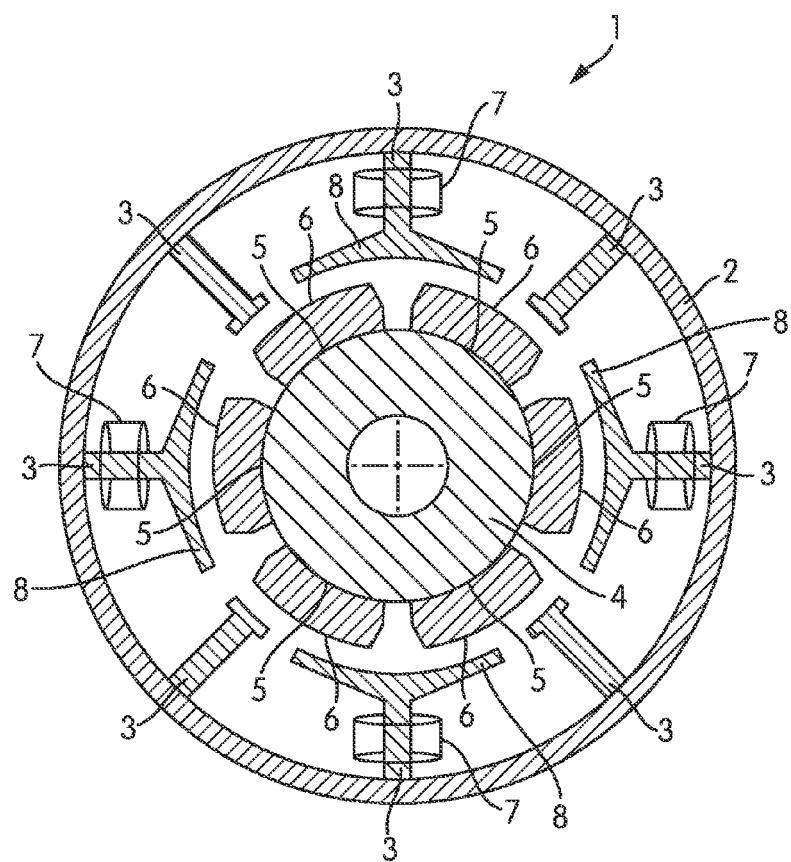
FIG. 1 shows a cross section of a two-phase synchronous machine.

FIG. 1 shows a schematic illustration of a cross section through an electrical machine in the form of a synchronous motor 1. The synchronous motor 1 has a stator arrangement 2 with eight stator teeth 3. The stator arrangement 2 is arranged in the form of a ring and concentrically around an axis of rotation of a rotor 4. On the inside, the stator arrangement 2 has a cutout which is likewise concentric around the axis of rotation.

The rotor has six rotor poles 5, which are formed with the aid of permanent magnets 6. The rotor 4 is arranged such that it can move rotatably about the axis of rotation in the cutout of the stator arrangement 2, with the result that the rotor poles 5 run past inner ends of the stator teeth 3 on rotation of the rotor 4. The rotor 4 can advantageously be formed with three ferrite magnet shells with, in each case, two-pole magnetization, or with a ring of polymer-bonded NdFeB.

The stator coils 7 are arranged on the stator teeth 3 in the form of a consequent-pole arrangement, i.e., only every second stator tooth 3 is provided with a stator coil 7 and has, as the inner end, a widened tooth tip 8 in comparison with unwound stator coils 3. The tooth tip 8 is used firstly to hold the stator coil 7 on the respective stator tooth 3 and secondly to widen the area of the magnetic flux produced by the stator coil 7 and directed onto the rotor 4.

The design of a synchronous machine shown in FIG. 1 is only an example, however, and it is also possible to use synchronous machines with different designs from this, with a two-phase bipolar configuration. In particular, synchronous motors with topologies with 8n (n=1, 2, 3, ..., n) and 6n rotor poles are conceivable. These topologies have the advantage that, by virtue of the choice of the number of stator teeth 3 and by virtue of the choice of a consequent-tooth arrangement, the winding phases formed by the stator coils 7 and each assigned to a phase are magnetically decoupled since they magnetize on axes which are perpendicular to one another with respect to an electrical rotor position and in addition are also separated from one another by auxiliary teeth, which form a magnetic return path. In principle, the invention can be applied to all two-phase synchronous motors in which the stator coils 7 are magnetically decoupled as far as possible.

Figure 2:
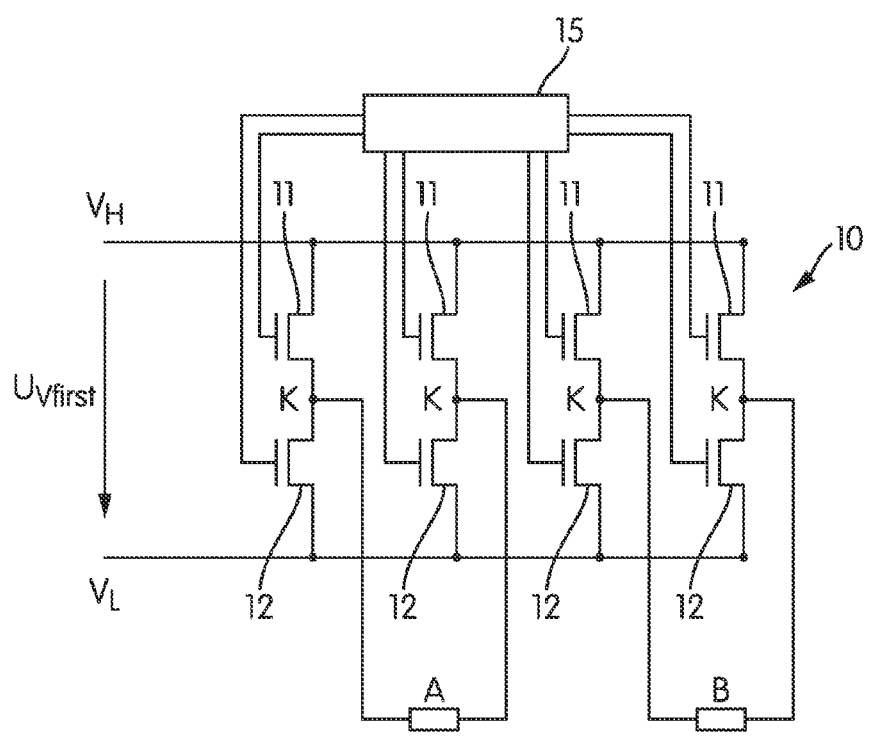
FIG. 2 shows a driver circuit in the form of a two-winding-phase H-bridge circuit.

FIG. 2 shows a driver circuit 10 for driving the two-phase bipolar synchronous motor 1. The driver circuit 10 has two bipolar H-bridge circuits. Each of the H-bridge circuits comprises two series circuits comprising power semiconductor switches 11. Each of the series circuits has a first power semiconductor switch 11, which is connected at a first connection to a high supply potential $V_H$ and at a second connection to an output node K. Furthermore, each of the series circuits has a second power semiconductor switch 12, which is connected at a first connection to the output node K and at a second connection to a low supply potential $V_L$. The supply voltage $U_{Vfirst}$ is present between the high supply potential $V_H$ and the low supply potential $V_L$.

In each case the two output nodes K of the series circuits in one of the H-bridge circuits are connected to one winding phase of the stator arrangement 2 of the synchronous motor 1. One winding phase comprises one or more stator coils 7, which are interconnected in a suitable manner for joint energization, i.e. in series, in parallel or a combination of series and parallel interconnections.

The winding phases A and B can be driven independently of one another with the aid of the driver circuit 10 shown in FIG. 2, with the result that said winding phases can be energized both individually and also at the same time with any desired polarity. The individual power semiconductor switches 11 are driven by a control unit 15, with the result that, depending on the selected switching states of the individual power semiconductor switches 11 in the H-bridge circuit, a positive supply voltage, the negative supply voltage or 0 V is applied. By using a pulse width modulation method, an rms voltage can be applied as drive variable to the respective winding phase A, B in dependence on a duty factor, said rms voltage being between the positive supply voltage $U_{Vfirst}$ and the negative supply voltage $-U_{Vfirst}$. The pulse width modulation method provides periodic driving, in which the positive supply voltage (or the negative supply voltage) is output during a first time window and 0 V is output as voltage during a second time window, via the output nodes K of one of the H-bridge circuits. The first time window and the second time window define a constant drive period, with the duty factor corresponding to the ratio of the duration of the first time window to the duration of the drive period.

In order to implement the driving (electrical commutation), voltages determined depending on the electrical rotor position are applied to the winding phases of the synchronous machine 1. The phase voltages for driving are determined depending on the rotor position. For this reason, it is necessary to determine the rotor position permanently in order to be able to apply the suitable phase voltages.

The rotor position is detected by means of permanent or regular measurement, or measurement at predetermined times, of the characteristic winding phase inductances, which vary depending on the rotor position. That is to say that, by assignment of a measured winding phase inductance, the electrical rotor position can be determined by back-calculation, by reading a family of characteristics or the like.

The characteristic winding phase inductances are determined by measurement pulses with a predefined temporal length (measurement pulse time window) being superimposed on the driving phase voltages, and edge gradients being measured as indications of rise times or fall times of a resultant electrical variable. An indication of the rise time of the resultant electrical variable can be measured, for example, by the edge, brought about by the measurement pulse, of the resultant electrical variable being subjected to threshold value comparisons. For example, the time period from the time at which a first threshold value is exceeded to the time at which a second threshold value is exceeded can be measured as an indication of the rise time. Alternatively, a fall time of an edge can also be measured as the time period from the time at which the electrical variable falls below a first threshold value to the time at which said variable falls below a second threshold value. It is possible to determine, from the indications of the rise times or the fall times, an indication of a winding phase inductance by virtue of a suitable, predetermined winding phase inductance function, for example in the form of a family of characteristics.

Figure 3:
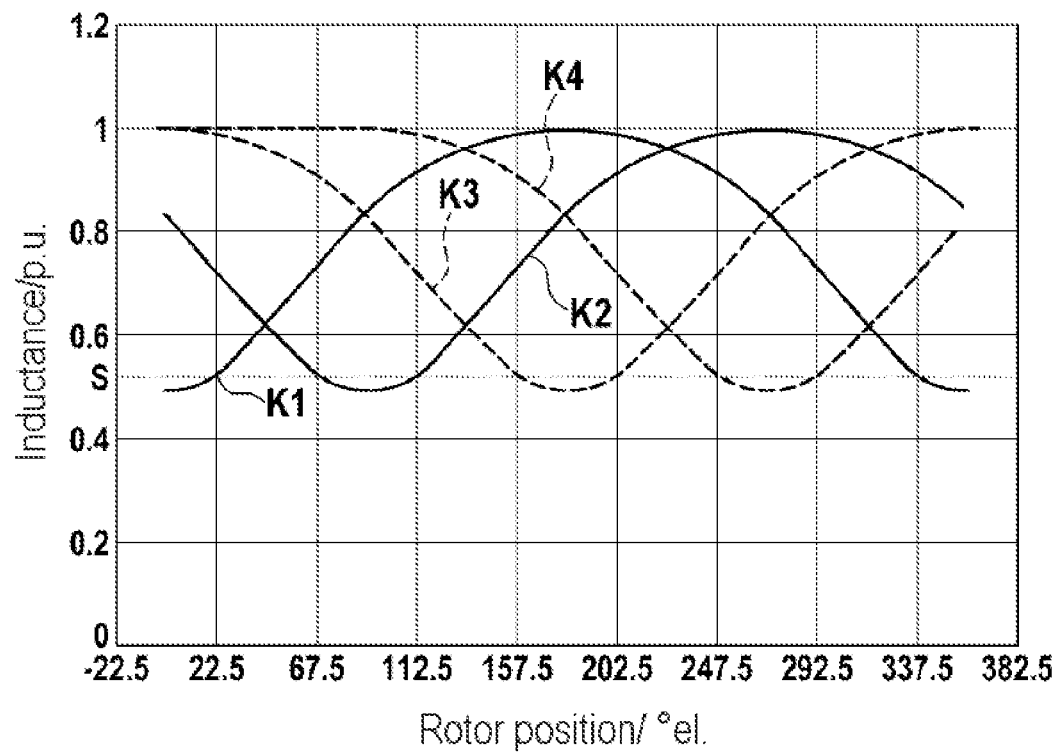
FIG. 3 shows a graph, by way of example, of the profiles of the measured inductances in dependence on the polarity of the applied measurement pulse and the winding phase as a function of the rotor position.

This results in a profile of the measured inductance indications as a function of the electrical rotor position, as is illustrated by way of example in FIG. 3. The electrical rotor position results from the mechanical rotor position multiplied by the number of rotor poles. The figure shows the profile of the inductance of a stator coil 7 or of an arrangement of a plurality of stator coils which is assigned to one of the phases as a function of the electrical rotor position. The four profiles of the inductance indications illustrated (in this case a measured inductance normalized to the real inductance) each correspond to inductance profiles for a pulse of positive voltage on the winding phase A (K1), a pulse of positive voltage on the winding phase B (K2), a pulse of negative voltage on the winding phase A (K3) and a pulse of negative voltage on the winding phase B (K4). The figure shows that the measured inductance given a determined electrical rotor position reaches a minimum of approximately 0.5 of the real (unsaturated) inductance. This rotor position corresponds to a rotor position at which the magnetic flux in the respective stator coil 7 reaches saturation, as a result which the inductance of the stator coil in question or the winding phase in question is dependent.

If, during the inductance measurement, a permanent magnet 6 of the rotor 4 is directly under (i.e. in the radial direction on a line) the stator coil 7 in question, when the permanent magnet field is intensified by the coil field there is a marked reduction in the winding phase inductance as a result of intensified saturation of the magnetic circuit in the region of the stator tooth 3. Opposite energization results in a slight rise in the inductance. In the case of magnets of opposite polarity, the resultant conditions are reversed, i.e., a negative current results in increased saturation, lower inductances and a more rapid current rise. By combining positive and negative current pulses in the winding phases A and B, it is thus possible to identify four ranges of the electrical rotor position which are characterized by a measurably lower inductance, depending on the nature and rotor position of the applied measurement pulse. The associated ranges of the rotor position can thus always be derived from the current rise times.

Impressing a current pulse for determining the rotor position can result in interference in the torque generation when the current pulse is implemented at the same time as energization of the stator coil for generating a torque. In addition, in this case the torque ripple can increase. Furthermore, the measurement of the inductance indication can also be impaired by the energization of the stator coil 7, in particular in the event of a change in the current flow during the measurement.

In two-phase synchronous motors it has been conventional until now to perform the energization of a phase in an angular range of an electrical rotor position of 180° with a drive variable (voltage, current) of positive polarity and, for a range of 180° of the electrical rotor position, with a drive variable (voltage, current) of negative polarity. The variable of the applied voltage and/or current can be varied by pulse width modulation driving of the safety isolation. Since the drive variable is normally present throughout the time window, it is not possible to implement measurement of the inductance without the abovementioned disadvantages.

In this regard, the invention proposes limiting the energization of one phase to a position range of less than 180°. This results in time windows during which one phase is not energized, i.e. a voltage of 0 V is applied.

Figure 4:
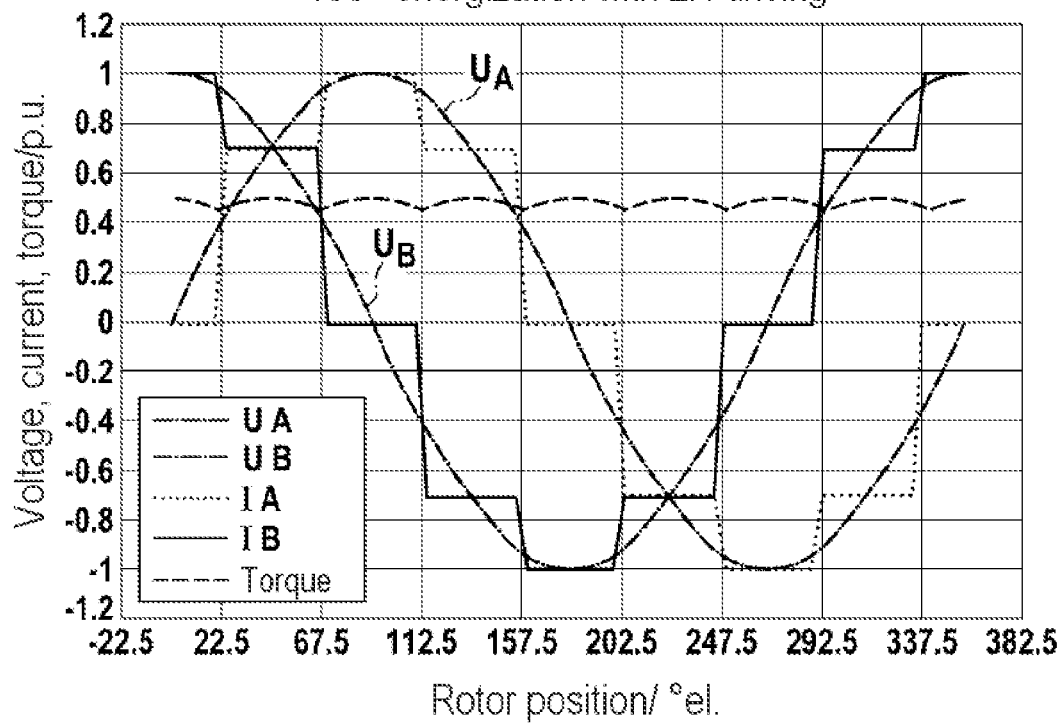
FIG. 4 shows a schematic illustration of the drive method given an electrical block length reduced to 135°, in accordance with one embodiment.

FIG. 4 shows a graph illustrating the profiles of the phase currents and the phase voltages and the resultant torque. The graph shows an example of energization representing the phase current with a block length of 135° electrical rotor position. That is to say that during a time period within which the rotor moves over an electrical rotor position of 180°, a voltage is only applied during a time window in which the rotor is moving in a range of 135°. In other words, there is no current applied to the stator coil during a rotation of the rotor over a rotary angular range of 45° electrical rotor position. For the example shown, this means that in the angular range of from 0° to 22.5° electrical rotor position and in the angular range of from 157.5° to 180° electrical rotor position, no voltage is applied to the stator coil 7 of the corresponding phase. That is to say that the current blocks for each phase which is applied during the movement of the rotor over an electrical rotor position of 180° are limited to a relatively small angular range, with the result that time windows are produced in which no voltage for generating a torque is applied.

The loss of torque which results from the reduction in the temporal length of the current block is compensated for by the voltage, i.e. the current amplitude, being increased within the current block in the range of the rotor position of 180°, for example in the temporal center of the current block. This increase is such that the loss of torque is compensated for by the non-energization in the range of 45° electrical rotor position. Preferably, the voltage pulses are matched to the sinusoidal current profile. As a result, a low torque ripple can be achieved, and at the same time it is possible for energization gaps to be produced, in which test pulses for rotor position determination can be transmitted without affecting the driving of the synchronous motor 1. In other words, in the electrical rotor positions in which only a very small amount of torque is generated through a winding phase, the corresponding winding phase is not energized and the current is increased for this purpose during a time window in the center of the energization block, with the result that more torque is formed there.

Owing to the magnetic decoupling of the winding phases, the measurement pulse for rotor position determination is not impaired, or is only impaired to an insignificant extent, by the current in the other winding phase.

When the electrical rotor position ranges with low measured inductances, which result from the inductance measurement with measurement pulses, are sufficiently wide and pronounced, the rotor position can even be resolved into more than four, for example eight, ranges. In order to determine four ranges of electrical rotor position, it is sufficient to ascertain whether an inductance measured with a specific measurement pulse on a specific winding phase is lower than a limit value to be fixed. In order to determine more than four, in particular eight, ranges of electrical rotor position, it is necessary to ascertain whether at least two inductance indications measured with a respective measurement pulse on one or more specific winding phases and with the same or different polarities are each lower than one or more limit values to be fixed. It is thus also possible to identify intermediate positions in order to provide the rotor position with finer resolution. This makes it possible to implement the driving shown in FIG. 4 with a block length of 135° since the commutation times at which switching between the different current and voltage levels to be applied to the winding phases (degree of control) takes place can be discriminated by the inductance measurement.

The graph in FIG. 3 illustrates the inductance profile for various test pulses. When considering the winding phase A and the driving thereof with a block length of 135°, the electrical commutation, i.e., the driving with corresponding phase currents in predetermined time windows, can be determined by threshold value comparisons of the measured normalized inductances. For example, by way of control, a phase current of 0 V is applied to the winding phase A until the inductance determined with the aid of a first of the measurement pulses of positive polarity (curve K1) on the winding phase A exceeds a threshold value S. The threshold value S is exceeded by the inductance detected by the first measurement pulse at an electrical rotor position of 22.5°. If this is ascertained, a current with a first positive current value is applied, i.e. from an electrical rotor position of 22.5°. The inductance continues to be measured with the aid of a second measurement pulse, which has a negative polarity. When the inductance measured by the second measurement pulse (curve K2) falls below the threshold value S, the phase current of the winding phase A is again set to 0 A.

Furthermore, the phase current of the winding phase A is set to a second negative current value when the inductance measured by the second measurement pulse (curve K2) exceeds the threshold value S. If the inductance measured by the first measurement pulse (curve K1) falls below the threshold old value S again, the phase current is set to 0 A. That is to say that as long as either the inductance measured by the first measurement pulse or the inductance measured by the second measurement pulse falls below the threshold value, a phase current of 0 A is applied.

The excessive increase in the phase current in the direction of positive currents or in the direction of negative currents in the center of the respective current block takes place as long as an inductance measured by a third measurement pulse on the second winding phase B with positive polarity (curve K3) or an inductance measured by a fourth measurement pulse on the second winding phase B with negative polarity (curve K4) falls below the threshold value S.

The method is implemented analogously for the second winding phase B, i.e. in the same way but with the winding phases A, B swapped over.

Figure 5:
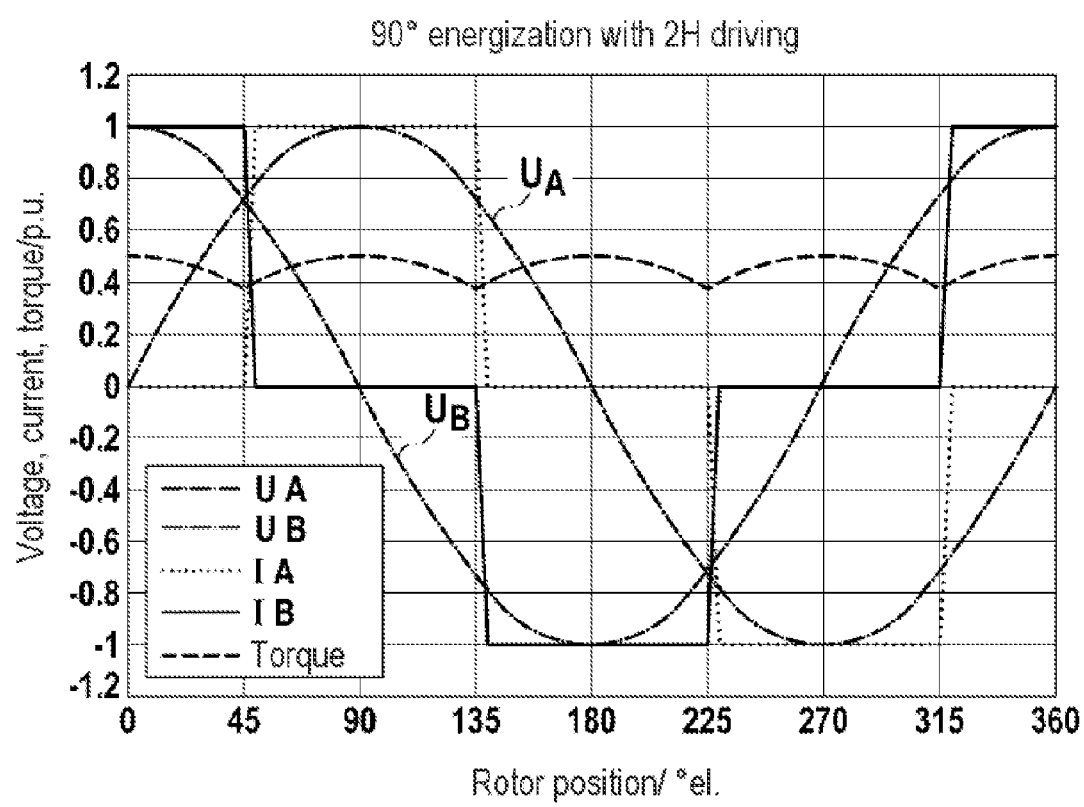
FIG. 5 shows a schematic illustration of the voltage and current profiles given an electrical block length reduced to 90°, in accordance with a further embodiment.

FIG. 5 shows a further example with energization of the winding phases with a block length of a range of 90° electrical rotor position. In this case, a first winding phase A is energized at an electrical rotor position of between 45° and 135° in accordance with a current block of positive polarity and of between 225° and 315° with a current block of negative polarity. For a second winding phase B, energization takes place between 0° and 45° and between 315° and 360° with a current block of positive polarity and between 135° and 225° with a current block of negative polarity. In the remaining ranges of the electrical rotor position, no voltage or no current is applied to the winding phases A, B.

The remaining electrical rotor position ranges of the winding phases in which there is no energization of the respective winding phase are therefore suitable for applying a measurement pulse for determining the rotor position in the respective winding phase. In order to ensure that, when determining the rotor position, the individual ranges of the electrical rotor position are determined sufficiently accurately in order to define the block length for energization, either a plurality of current measurements with a plurality of test pulses is performed or corresponding inductance measurements are performed between the individual measurements during the time windows in which the respective winding phase is not energized and the intermediate positions for the thus determined electrical rotor positions are determined by extrapolation.

By virtue of the present method, it is possible to markedly reduce the times for measurement pulses in which the torque-forming energization is suspended in comparison with the known methods since the torque-forming method envisages time windows in which one or the other winding phase is not energized, with rotor position measurements being performed in the time windows in which there is no energization.

The advantage of the above-described method consists in that it can be used even when the synchronous machine is at a standstill. Owing to the magnetic decoupling of the winding phases A and B, the influence of the inductance is measured in isolation, without the influences of the other winding phases, and the measurement pulses can be applied simultaneously, as a result of which the time required for applying the measurement pulses can be reduced. In addition, the test pulses can be introduced in the energization gaps, in which no torque is generated in any case.

The combination of a bipolar, two-phase driver circuit with a topology of a synchronous motor with 8 stator teeth and 6 rotor poles with a consequent-tooth arrangement results in an advantage over a three-phase synchronous machine in terms of a higher winding factor. In the case of three-phase driving, inductances which are dependent on current and rotor position are likewise used for rotor position identification. However, the problem is encountered here that it is not possible to determine the rotor position definitively in all circumstances. The difficulty consists in that, by means of three-phase driving of a star-connected synchronous machine, for example, one winding phase in which the effect to be evaluated of the current-dependent and position-dependent inductance occurs and simultaneously two winding phases in which it does not occur are always measured. Therefore, the relative difference in the inductances is low. Even in the case of a delta connection, one winding phase with saturation in the stator tooth and two winding phases without saturation in the stator tooth would always be measured at the same time. The effect to be evaluated is only sufficiently great for reliable identification when the additional inductance depending on the rotor position as a result of the difference in the reluctance between the consequent pole and the magnet pole is also included.

The invention claimed is:

1. A method for determining a rotor position of a two-phase synchronous machine having a first winding phase and a second winding phase for electronically commutating the synchronous machine, the method comprising:
    driving each of the first and second winding phases alternately in a first drive time window with a drive variable of positive polarity and in a second drive time window with a drive variable of negative polarity, the first drive time window and the second drive time window directly following one another alternately;
    applying a drive variable of 0 to the first winding phases during a measurement time window, which is provided within at least one of the drive time windows of a winding phase;
    applying a measurement pulse to the first winding phase within the measurement time window;
    determining a winding phase inductance of the first winding phase caused by the measurement pulse;
    determining the rotor position based on the determined winding phase inductance of the first winding phase,
    changing the drive variable to the first winding phase when the determined winding phase inductance of the first winding phases exceeds or falls below a predetermined threshold value, and
    wherein, during the measurement time window, a drive current is applied to the second winding phase, the drive current being selected in such a way that a torque of the synchronous machine generated during the measurement time window corresponds to a torque which is generated by application of drive variables unequal to 0 to the first and second winding phases.

2. The method as claimed in claim 1, wherein an electrical rotor position is assigned to the determined winding phase inductance of the first winding phase.

3. The method as claimed in claim 1, wherein the measurement pulse is applied, as a measured variable of positive or negative polarity, to one of the winding phases during a defined measurement pulse time window.

4. The method as claimed in claim 1, wherein the rotor-position-dependent winding phase inductance is determined by measuring an indication of an edge gradient of an edge of a resultant variable which is caused by the application of the measurement pulse.

5. The method as claimed in claim 4, wherein the indication of the edge gradient is implemented by two threshold value comparisons of the variable resulting from the application of the measurement pulse with predetermined threshold values, and the time period from the time at which a first of the threshold values is reached to the time at which a second of the threshold values is reached is provided as an indication of the edge gradient.

6. A computer program product having a program code which, when run on a data processing device, implements the method as claimed in claim 1.

7. A control device for operating a two-phase synchronous machine having a first winding phase and a second winding phase, wherein the control device is configured:
    to drive each of the first and the second winding phases alternately in a first drive time window with a drive variable of positive polarity and in a second drive time window with a drive variable of negative polarity, the first drive time window and the second drive time window following one another alternately;
    to apply a drive variable of 0 to the first winding phases during a measurement time window, which is provided within at least one of the drive time windows of one of the winding phases;
    to apply a measurement pulse to the first winding phase within the measurement time window;
    to determine a winding phase inductance of the first winding phase caused by the measurement pulse;
    to determine a rotor position of the two-phase synchronous machine based on the determined winding phase inductance of the first winding phase,
    to change the drive variable of the first winding phase when the determined winding phase inductance of the first winding phases exceeds or falls below a predetermined threshold value, and
    during the measurement time window, to apply a drive current to the second winding phase, the drive current being selected in such a way that a torque of the synchronous machine generated during the measurement time window corresponds to a torque which is generated by application of drive variables unequal to 0 to the first and second winding phases.

8. A motor system, comprising:
    a two-phase synchronous machine having two winding phases;
    a bipolar driver circuit for providing a bipolar drive variable for each of the winding phases of the synchronous machine; and
    the control device as claimed in claim 7.

* * * * *